United States Patent [19]

Gautney et al.

[11] Patent Number: 4,954,156

[45] Date of Patent: Sep. 4, 1990

[54] N,N-DIHALO-2-IMIDAZOLIDINONES AND N-HALO-2-OXAZOLIDINONES AS UREASE AND NITRIFICATION INHIBITORS

[75] Inventors: Joe Gautney, Sheffield; Shelby D. Worley, Auburn; Doris H. Ash, Florence, all of Ala.

[73] Assignees: Tennessee Valley Authority, Muscle Shoals; Auburn University, Auburn, both of Ala.

[21] Appl. No.: 297,165

[22] Filed: Jan. 17, 1989

[51] Int. Cl.$^5$ .................................................. C05G 3/08
[52] U.S. Cl. ............................................ 71/28; 71/29; 71/30; 71/902; 71/903
[58] Field of Search ................. 71/6, 7, 902, 28–30, 71/903

[56] References Cited

U.S. PATENT DOCUMENTS

| | | | |
|---|---|---|---|
| 3,482,957 | 12/1969 | Ueno et al. | 71/902 X |
| 3,542,537 | 11/1970 | Hanson et al. | 71/902 X |
| 3,544,295 | 12/1970 | Nakamigawa et al. | 71/902 X |
| 3,573,028 | 3/1971 | Ueno et al. | 71/902 X |

Primary Examiner—Ferris H. Lander
Attorney, Agent, or Firm—Robert A. Petrusek

[57] ABSTRACT

The invention described herein comprises two principal embodiments. The first embodiment comprises operating procedures related to the instant invention which along with urease inhibition test results demonstrate the use of two classes of N-Halamine compounds (N,N'-DIHALO-2-IMIDAZOLIDINONES and N-HALO-2-OXAZOLIDINONES) as inhibitors of the activity of the enzyme urease in solution and agricultural soil systems. The second embodiment comprises operating procedures related to the instant invention which along with nitrification inhibition test results demonstrate the use of the two classes of N-Halamine compounds (N,N'-DIHALO-2-IMIDAZOLIDINONES and N-HALO-2-OXAZOLIDINONES) as inhibitors of nitrification in agricultural soil systems.

32 Claims, 5 Drawing Sheets

AQUEOUS SYSTEM UREASE INHIBITION TEST
RESULTS WITH N,N-DIHALO-2-IMIDAZOLIDINONES

NITRIFICATION INHIBITION TEST RESULTS WITH N-HALAMINE COMPOUNDS

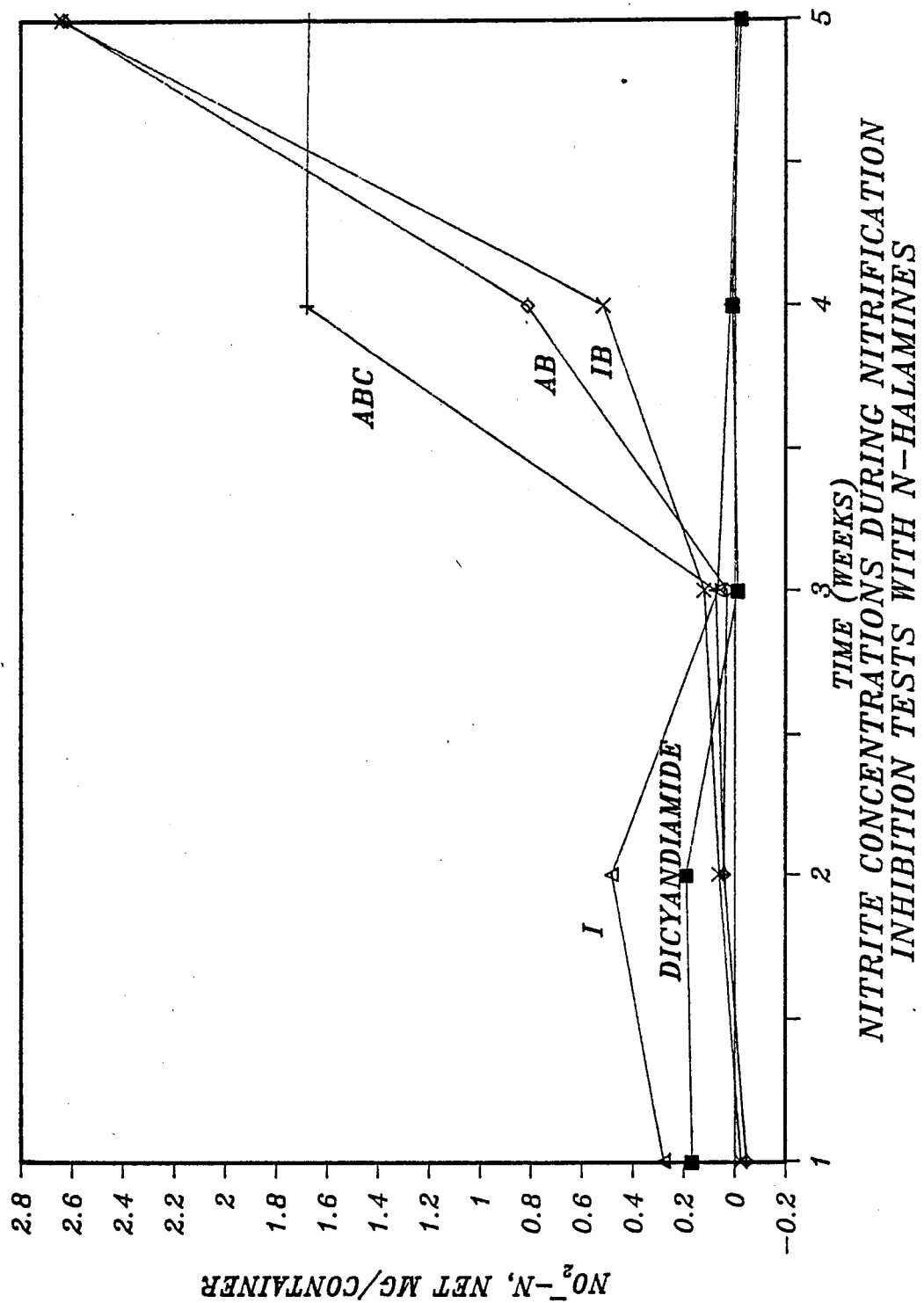

N,N-DIHALO-2-IMIDAZOLIDINONES AND N-HALO-2-OXAZOLIDINONES AS UREASE AND NITRIFICATION INHIBITORS

The invention described herein may be manufactured and used by or for the Government for governmental purposes without the payment to us of any royalty therefor.

INTRODUCTION

Loss of fertilizer nitrogen from agricultural cropland is a worldwide problem. Nitrogen, being one of the three primary plant nutrients (nitrogen, phosphorus, and potassium), is used in the largest quantities but, unfortunately, with the least efficiency. It is estimated that, worldwide, only about 40 percent of the applied fertilizer nitrogen is recovered by crops (G. Cooke, "Constraints to Crop Production-Opportunities for the Chemical Industry," Seminar presented at the International Fertilizer Development Center, Mar. 9, 1984). This loss of fertilizer nitrogen represents both an economic burden and a substantial pollution source. In the U.S. alone, it is estimated that the annual loss of fertilizer nitrogen represents an unrecovered investment of some 700 million dollars [J. Gautney, Y. K. Kim, and P. M. Gagen, *I&EC Chem. Prod. Res. Dev.* 23, No. 3, 483–489 (1984)]. There also exists an ever growing concern relating to nitrate pollution of groundwater from the agricultural usage of nitrogen-based fertilizers. For instance, L. W. Cantor [*Ground Water Quality and Agricultural Practices*, D. M. Fairchild, editor, Lewis Publishers, Inc., Chelsea, MI, 153–174 (1987)] recently conducted a literature survey to determine the extent of nitrates in groundwater and concluded that nitrate pollution of groundwater from agricultural applications of fertilizers is a widespread problem in the U.S.

About half of the nitrogen not utilized by crops is immobilized as soil inorganic nitrogen; the other half is lost via one or both of two quite different reaction sequences which occur after nitrogen-containing fertilizer is added to the soil.

The first sequence of reactions, which occur with urea based fertilizers, is the urease catalyzed hydrolysis of urea to ammonia according to the overall reaction:

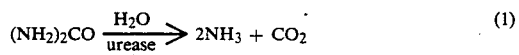

(1)

The ammonia produced reacts with soil water to set up the following equilibrium:

$$NH_3 + H_2O \rightarrow NH_4^+ + OH^-$$ (2)

Reaction (1) supra serves a vital function in providing inorganic nitrogen for growing plants. However, the urease-induced hydrolysis of urea is very rapid, and this can cause a buildup of free ammonia in the soil microsite around the fertilizer. As a result, considerable loss of ammonia by volatilization often occurs. Loss of ammonia is especially a problem when urea fertilizers are surface applied to agricultural soils [Darrell W. Nelson, "Nitrogen in Agricultural Soils," *Am. Soc. Agron.*, Madison, WI, 327–358 (1982)]. Most of ammonia volatilization from urea occurs in the first week after application. Moderate delays in urea hydrolysis during this time period can greatly reduce ammonia volatilization losses for several reasons. For instance, the farmer has more time to incorporate urea beneath the soil surface before such ammonia losses occur. There is a greater probability of receiving rain with resulting incipient percolation of fertilizer nitrogen values into the soil before such ammonia losses occur.

The second reaction sequence, which results with ammonia based fertilizers such as ammonium nitrate, and ultimately, with urea based fertilizers after they are converted to ammonium forms by reactions 1 and 2 above, is the biological oxidation of ammonium to nitrite and nitrate by nitrosomonas and nitrobacter bacteria (reaction (3)). For the sake o convenience, cations such as for example, ammonium, and anions such as for example, nitrate and nitrite, will hereinafter oftentimes simply be referred to as ammonium, or nitrate and nitrite.

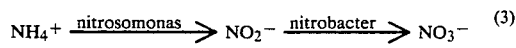

(3)

This process, known as nitrification, leads to nitrogen losses by leaching and denitrification. The leaching losses occur because the negatively charged nitrite and nitrate anions are very mobile moving down through the soil profile with water. As a result, the nitrogen is leached below the root zone where it becomes physically inaccessible to the plant and may pollute groundwater. In contrast, the positively charged ammonium cation is relatively immobile because it is attracted and held in the root zone by negatively charged soil particles. The denitrification losses result from biological reduction of nitrite and nitrate to gaseous nitrogen forms, $NO_x$ and $N_2$, which are lost to the atmosphere. In the U.S. it has been reported that approximately 25 percent of the applied fertilizer nitrogen is lost by leaching and denitrification [E. C. Varsa and D. M. Huber, *Solutions*, 60–64, Feb. 1983, and D. M. Huber, *Solutions*, 86–90, March/April 1980].

From the above description it is obvious that the efficiency of nitrogen fertilizers can be increased and the potential for nitrate pollution reduced by delaying the urease catalyzed hydrolysis of urea and/or the nitrification of ammonium nitrogen. Substances which delay reactions (1) and (3) supra are known as urease inhibitors and nitrification inhibitors, respectively.

BACKGROUND OF THE INVENTION

1. Field of the Invention

The concept underlying the gist of the instant invention is based on the unexpected discovery that two classes of N-Halamine compounds (N,N'-DIHALO-2-IMIDAZOLIDINONES and N-HALO-2-OXAZOLIDINONES) are effective urease and nitrification inhibitors. Members of the N,N'-DIHALO-2-IMIDAZOLIDINONE class of compounds have been previously patented in U.S. Pat. No. 4,681,948, *Worley*, July 21, 1987, who also described the use of this class of compounds as biocides for control and prevention of microorganisms in aqueous media, particularly industrial water systems, potable water, swimming pools, hot tubs and waste water treatment facilities, and in sanitizing applications. Similarly, members of the N-HALO-2-OXAZOLIDINONE class of compounds have been patented in U.S. Pat. Nos. 3,591,601, *Walles*, July 6, 1971; 3,931,213, *Kaminski* et al., Jan. 6, 1976; and 4,009,178, *Bodor* et al., Feb. 22, 1977; and their use as biocides described. U.S. Pat. No. 4,000,293, *Kaminski* et al., Dec. 28, 1976, teaches the use of 3-chloro-2- oxazolidinones for inhibiting bacterial growth. More recently the 3-chloro2-oxazolidinones have been patented for controlling the growth of the microorganism *Legionella pneumophila* in recirculating aqueous mediums in air cooling systems U.S. Pat. No. 4,659,484, Worley et al., Apr. 21, 1987. Even though the N,N'-DIHALO-2 IMIDAZOLIDINONES and N-HALO-2-OXAZOLIDINONES have been previously patented, supra, their use as inhibitors of urease catalyzed hydrolysis of urea in aqueous and soil systems and as inhibitors of the nitrification of ammonium nitrogen in soil systems have heretofore been unknown.

2. Description of Prior Art

Embodiment 1: Although several hundred scientific papers have been published on ureas since Summer 1926 first produced the classical octahedral crystals and showed that the enzyme was a protein, it was not until 1969 that Zerner's group [R. L. Blakeley, E. C. Webb, and B. Zerner, *Biochemistry* 8, 1984–1990 (1969)] first prepared a highly purified urease with a full specific activity and in at least a 99% homogeneous state. They established with this preparation a reproducible molecular weight (about 590,000) and proposed that the molecule contained six subunits with asparagine as the N-terminal amino acid. Although previous work (J. F. Ambrose, G. B. Kistiakowsky, and A. G. Kridl, *J. Am. Chem. Soc.* 73, 1232 (1951)] had indicated that four or eight essential SH-groups were involved in the urea-hydrolysis reaction, Zerner's group confirmed that the active site SH-groups "react slowly with N-ethylmaleimide," but they were unable to define unequivocally the number of "essential SH groups" in the 590,000 molecular weight species. In addition, Kobashi et al. [K. Kobashi, J. Hase, and T. Komai, *Biochem. Biophys. Res. Commun.* 23, 34 (1966)], on the basis of inhibition by hydroxamic acids, suggested that the number of active sites in the 590,000 molecular weight species of sword bean urease was two. These results seem to be confirmed by the discovery that highly purified urease from Jack Bean [N. E. Dixon, C. Gazzola, R. L. Blakeley, and B. Zerner, *J. Am. Chem. Soc.* 97 4131 (1975)] and from tobacco, rice, and soybean [J. C. Polacco, *Plant Science Letters* 10 249–255 (1977)] contained stoichiometric amounts of nickel (two atoms per active site), demonstrating simultaneously the first biological role definitely assigned to nickel.

Over the last few years considerable effort has been made to elucidate the mechanism of the urease reaction. Elucidation of the mechanism of the urease reaction is complicated because the enzyme has a tendency to form polymers and isozymes changing the properties of the original monomeric enzyme and probably the mechanism of reaction [W. N. Fishbein and K. Nagarajan, *Arch. Biochem. Biophys.* 144, 700–714 (1971)]. In addition, the properties of soil urease differ significantly from those of ureases from other sources [J. M. Bremner and R. L. Mulvaney, *Soil Enzymes*, R. G. Burns, editor, Academic Press, 149–196 (1978)]; it is much more difficult to obtain reliable kinetic data for enzymes in heterogeneous environments, such as soil, than for enzymes in homogeneous solutions. As a result, most attempts to elucidate the mechanism of urease inhibition have been confined to nonsoil systems.

Attempts to demonstrate the formation of a carbamoyl-enzyme intermediate, which was postulated many years ago, have so far failed; Zerner's group [N. E. Dixon, P. W. Riddles, C. Gazzola, R. L. Blakeley, and B. Zerner, *Can J. Biochem.* 58, 1335–1344 (1980)] proposed a mechanism of reaction on the basis of a carbamoyl-transfer reaction and where the substrate is activated toward nucleophilic attack by O-coordination to a $Ni^{+2}$ ion. Both $Ni^{+2}$ ions are involved in this proposed mechanism. A second mechanism of reaction based on the determination of kinetic isotope effects [R. Medina, T. Olleros, and H. L. Schmidt, *Proc. 4th Int. Conference on Stable Isotopes*, H. L. Schmidt, H. Forstel, and K. Heizinger, editors, Julich, Mar. 1981, Elsevier, Amsterdam, 77–82 (1982)] was proposed. These results indicated the existence of an enzyme-bound carbamate intermediate and demonstrated that the enzyme-Ni-substrate complex decomposes, releasing the first NH3 in a slow, rate-limiting step.

Most enzymes can be poisoned or inhibited by certain chemical reagents. There are two major types of enzyme inhibitors: irreversible and reversible. Irreversible inhibitors combine with or destroy a functional group on the enzyme molecule that is necessary for its catalytic activity. Reversible inhibitors generally are considered to be either competitive or noncompetitive. Competitive inhibitors compete with the substrate for binding to the active site, but once bound cannot be transformed by the enzyme. An identifying feature of competitive inhibition is that it can be reversed by increasing the substrate concentration. Noncompetitive inhibitors do not bind at the site on the enzyme at which the substrate does; however, their binding to the enzyme alters the structure or conformation of the enzyme so that reversible inactivation of the catalytic site results.

Many urease inhibitors have been identified; however, few kinetic descriptions include the type of inhibition. The reversible and competitive inhibition of sword bean urease by a wide variety of hydroxamic acids was discovered by Kobashi et al. [K. Kobashi, J. Hase, and K. Uehara, *Biochim. Biophys. Acta* 65, 380–383 (1962)]. Kinetic and spectral studies performed by B. Zerner and coworkers [N. E. Dixon, J. A. Hinds, A. K. Fihelly, C. Gazzola, D. J. Winzor, R. L. Blakeley, and B. Zerner, *Can. J. Biochem.* 58, 1323–1334 (1980)] established that hydroxamic acids were reversibly bound to active-site nickel ions in Jack Bean urease. Chemical and Physical studies of the enzymatically inactive phosphoramidate-urease complex provide convincing evidence that Phosphoramidate binds reversibly to the active-site nickel ion [N. E. Dixon, R. L. Blakeley, and B. Zerner, *Can. J. Biochem.* 58, 481–488 (1980)].

The kinetics of urease inhibition by phenyl phosphorodiamidate (which demonstrates a competitive inhibition) and hydroquinone (which exemplifies a mixed inhibition mechanism) were performed by L. J. Youngdahl and E. R. Austin at the International Fertilizer Development Center (IFDC, unpublished results). A kinetic study of the soil urease inhibition by six substituted ureas, which are used as herbicides, showed that all six compounds exhibited mixed inhibition characteristics (competitive and noncompetitive) [S. Cervelli, P. Nannipieri, G. Giovannini, and A. Perna, *Pesticide Biochem. Physiol.* 5, 221–225 (1975)].

Many other compounds have been identified as urease inhibitors. Mulvaney and Bremner [R. L. Mulvaney and J. M. Bremner, *Soil Biochem.* 5, 153–196 (1981)] have published an extensive review on urease inhibitors. More recently, Gould and coworkers [W. D. Gould, C. Hagedorn, and R.G.L. McCready, "Urea Transformations and Fertilizer Efficiency in Soil," *Advances in Agronomy* 40, 209–238 (1986)] described a number of urease inhibitors. These inhibitors were classified into three groups (sufhydryl reagents, hydroxamates, and structural analogs of urea and related compounds). Members of these three classes of compounds plus a fourth class (agricultural chemicals which inhibit urease) have been more extensively described by Medina and Radel (R. Medina and R. J. Radel, "Mechanisms of Urease Inhibition," submitted for publication in *Ammonia Volatilization From Urea Fertillzers*, Bert R. Bock and David E. Kissel, editors, to be published by the Tennessee Valley Authority).

Although a wide variety of chemicals have been shown to inhibit urease activity, none have yet been commericalized. Phenyl phosphorodiamidate (PPDA), $(C_6H_5O)PO(NH_2)_2$, has probably been the most widely studied urease inhibitor in recent years and until recently was considered the best known inhibitor. Extensive work directed at commercializing PPDA has been conducted at the Tennessee Valley Authority's National Fertilizer Development Center. Most of this work has been directed at determining the compatibility of PPDA at process conditions typically encountered during urea granulation [J. Gautney, Y. K. Kim, and P. M. Gagen, *I&EC Prod. R&D* 23, No. 3, 483–489 (1984)], in fluid fertilizers [J. Gautney. Y. K. Kim, and A. R. Barnard, "Solubilities and Stabilities of the Nitrogen Loss Inhibitors Dicyandiamide, Thiourea, and Phenyl Phosphorodiamidate in Fluid Fertilizers," *I&EC Prod. R&D* 24, No. 1, 155–161 (1985)], and in solid urea during long-term bulk storage [J. Gautney, A. R. Barnard, D. B. Penney, and Y. K. Kim, "Solid-State Decomposition Kinetics of Phenyl Phosphorodiamidate," *Soil Science Society of America Journal* 50, 792–797 (1986)]. The results of these studies clearly indicate that PPDA can be cogranulated with urea but decomposes relatively rapidly in solid mixtures with urea and in fluid fertilizers. As a result, commercialization of PPDA does not, at this time, appear to be promising.

Two relatively new inhibitors, thiophoshoryl triamide, (TPTA), $(NH_2)_3PS$ and N-(n-butyl)-thiophosphoryl triamide, (NBTPTA), $[NH(CH_3CH_2CH_2CH_2)](NH_2)_2PS$, are currently receiving considerable attention in terms of commercial development. Both of these compounds have been shown to yield inhibition characteristics which are superior to those of PPDA. The Tennessee Valley Authority has been granted a statuatory invention registration on TPTA (SIR No. H25, Radel, Feb. 4, 1986) and U.S. Pat. No. 4,676,822, *Gautney*, June 30, 1987, on the use of TPTA in fluid fertilizers. The inhibitor NBTPT was patented by Allied Corporation in U.S. Pat. No. 4,530,714, *Kolc* et al., July 23, 1985.

Fertilizer compatibility studies with TPTA (TVA Bulletin Y-191, "New Developments in Fertilizer Technology," October 1985) showed that this inhibitor can be cogranulated with urea and is relatively stable in fluid fertilizers containing urea, but like PPDA, decomposes in solid mixtures with urea (R. J. Radel, J. Gautney, A. A. Randle, J. E. Cochran, R. M. Miles, H. M. Williams, B. R. Bock, and N. K. Savant, "Evaluation of Thiophosphoryl Triamide as a Urease Inhibitor," paper presented at the 194th National Meeting of the American Chemical Society, Aug. 30-Sep. 4, 1987, New Orleans, LA). As a result, TPTA has considerable potential for use in urea containing fluid fertilizer but limited potential for use with solid urea. No data are currently available on the compatibility of NBTPTA with fertilizer materials. Field studies with TPTA and NBTPTA in urea containing fluid fertilizers are in progress.

Even though urease has been studied extensively for about 60 years and a large number of compounds have been identified as potential urease inhibitors, the fact that no such urease inhibitor has been commercially developed indicates the need to find, identify, and/or develop new and better compounds for such purposes. The invention described herein covers the use of two classes of N-halamine compounds as urease inhibitors. These compounds were not previously known to inhibit urease activity.

Embodiment 2: The biological oxidation (nitrification) of ammonium nitrogen ($NH_4^+$) to nitrate nitrogen ($NO_3^-$) reaction (3), supra, is an energy producing process involving a loss of eight electrons by the ammonium nitrogen and resulting in a nitrogen valence change from $-3$ to $+5$. The process is carried out in soils mainly by chemosynthetic autotrophs (Nitrobacteriaceae) in order to derive energy needed for their metabolic activities. The probable reaction sequence for the first step of nitrification (conversion of ammonium to nitrite by nitrosomonas) is: ammonia----hydroxylamine-----(nitroxyl?)-----(nitrohydroxylamine)?-----nitrite. The postulated intermediates nitroxyl (NOH) and nitrohydroxylamine ($NO_2\bullet NH_2OH$) have not been positively identified, but their participation in the reaction sequence is consistent with the assumption that two electrons are involved in each intermediate oxidation step from ammonium to nitrite (R. D. Hauck, "Mode of Action of Nitrification Inhibitors," *Nitrification Inhibitors-Potentials and Limitations*, ASA Special Publication No. 38, 1980, American Society of Agronomy, Madison, WI). The second step of nitrification (conversion of nitrite to nitrate) is a single step process which is carried out mainly by nitrobacter.

Numerous extensive and in-depth searches have been conducted during the past 25 years to find or identify chemicals that can inhibit the biological oxidation of ammonium to nitrate in soils. Since nitrite can be phytotoxic to plants, it is desirable that the first step of the nitrification process, the conversion of ammonium to nitrite, be preferentially inhibited because this avoids subsequent buildup of nitrite. A large number of chemicals have been found to inhibit nitrification. These chemicals include pyridines, pyrimidines, mercapto compounds, succinamides, thiazoles, triazoles, triazines, cyanamid derivatives, and various thio compounds [R. D. Hauck, "Technological Approaches to Improving the Efficiency of Nitrogen Fertilizer Use by Crop Plants," *Nitrogen in Crop Production*, American Society of Agronomy, Madison WI, 552–560 (1984)]. A number of agricultural pesticides also have been shown to inhibit nitrification. The herbicides N-N'-dimethyl-4-4-chlorophenyl urea, and ethyl and isopropyl carbamate have been shown to inhibit nitrification [M. H. Briggs and I. Segal, *Life Science* 2, 69–72 (1963)]. The pesticides diazion, manozeb, benzene hexachloride, pentachlorophenol, Vapam, maneb, and isodoacetic acid are also known nitrification inhibitors [T. Nishihara, *Bull. Fac. Agr. Kagoshima Univ.* 12, 107–158 (1962)].

In general, most nitrification inhibitors function by either retarding the growth and/or other life support function of nitrifiers. Inhibition can result from interference with the nitrifiers respiration and cytochrome oxidase function, by production of acid in the microenvironment, by chelation of essential metal ions, and by liberation of toxic compounds such as mercaptans, sulfoxides, and sulfones.

The biochemistry of several naturally occurring and synthetic substances which can act as nitrification inhibitors have been reviewed [J. H. Quastel, *Ann. Rev. Plant Physiol.* 16, 217–240 (1965)]. Methionine and some alkylmercapto amino acids delay the beginning of nitrification. This delay is believed to result from retardation of the proliferation of nitrifying organisms. Cystine and cysteine indirectly impede nitrification. Quastel [J. H. Quastel, *Plant Physiol.* 3, F. C. Steward, editor, Academic Press, New York, 671–756 1963)] suggested that these compounds are decomposed by soil heterotrophs with the formation of sulfuric acid which decreases soil pH to a level less favorable for nitrification. Later, researchers [J. M. Bremner and L. G. Bundy, *Soil. Biol. Biochem.* 6, 161–165 (1974)] presented evidence that cystine, cysteine, methionine, and other nonvolatile organic sulfur compounds may inhibit nitrification by decomposition to toxic carbon disulfide. Thiourea and allylthiourea are thought to inhibit nitrification by complexing with metallic cations such as $Cu^{+2}$, which are needed for the process of nitrification [J. H. Quastel, *Ann. Rev. Plant Physiol.* 16, 217–240 (1965)]. Copper chelating agents such as salicyladoxime and sodium diethyldithiocarbamate also retard nitrification [H. Lees, *Metabolic Inhibitors* 2, R. H. Hochester and J. H. Quastel, editors, Academic Press, New York, 615–629 (1963)]. Addition of copper cation ($Cu^{+2}$) has been shown to somewhat counteract the nitrification inhibition effect of thiourea but not that of allylthiourea [E. R. Campbell and M.I.H. Aleem, *Antione van Leeuwenhoek, J. Microbiol. Serol.* 31, 124–136 (1965)]. In contrast to thiourea, the inhibitors ethyl urethane [J. H. Quastel, *Plant Physiol.* 3, F. C. Steward, editor, Academic Press, New York. 671–756 (1963)], 2-chloro-6-(trichloromethyl) pyridine [C.A.I. Goring, *Soil Science* 93, 211–218 (1962)], sodium azide, and dicyandiamide retard nitrification by acting directly on the nitrosomonas species involved in the first step of nitrification [T. Nishihara, *Bull. Fac. Agr. Kagoshima Univ.* 12, 107–158 (1962)]. The inhibitors phenyl mercuric acetate, mono- and di-chlorophenyl isothiocyanates, and sodium chlorate preferentially inhibit the second step of the nitrification process, the conversion of nitrite to nitrate, [R. D. Hauck, "Synthetic Slow Release Fertilizers and Fertilizer Amendments," *Organic Chemicals in the Soil Environment* 2, C.A.I. Goring and J. W. Hamaker, editors, Marcel Dekker, New York, 633–690 (1972)].

Although a large number of many different types of compounds have been found to inhibit nitrification (many of which are patented), only seven have been recently produced commercially for use as nitrification inhibitors. Four of these [2-amino-4-chloro-6-methyl pyridine (AM), 2-mercaptobenzothiazole (MBT), sulfathiazole (ST), and thiourea (TU) are produced and marketed primarily in Japan.

In the U.S. the compound 2-chloro-6-trichloromethyl pyridine (nitrapyrin) was commercialized as N-Serve in 1974 and has remained on the market since that time. Another compound, 5-ethoxy-3-trichloromethyl-1,2,4-thiadiazole (ETT), was licensed in the U.S. as a nitrification inhibitor by Olin Corporation in 1982. Olin had previously marketed the compound as a fungicide under the trade name Terrazole. Terrazole was marketed by Olin as a nitrification inhibitor under the trade name Dwell for about one year but was withdrawn from the market at about the same time that Olin's Agrichemicals Division was purchased by Uniroyal Inc., on Oct. 1, 1983. Apparently, Uniroyal is not presently marketing Dwell.

The compound dicyandiamide has received much attention in the U.S. in recent years because it offers some distinct advantages over nitrapyrin and ETT. Both nitrapyrin and ETT have relatively high vapor pressures. These vapor pressures prevent cogranulation of nitrapyrin and ETT with solid fertilizers such as urea. Their use with nitrogen solutions is also limited because of volatilization losses during fertilizer processing and application. As a result, nitrapyrin and ETT are used primarily with anhydrous ammonia; however, even then, special precautions must be taken. Nitrapyrin can be tank mixed with anhydrous ammonia but has a maximum recommended shelf life of three weeks (Dow Chemical Company USA, "N-Serve Nitrogen Stabilizer," Technical Information Bulletin, Ag-Organics Department, Midland, MI). ETT cannot be tank mixed with anhydrous ammonia and therefore must be applied simultaneously from a separate tank.

Dicyandiamide, or the other hand, has very little vapor pressure and as a result can be cogranulated with solid fertilizers such as urea without significant losses of inhibitor [J. Gautney, Y. K. Kim, and P. M. Gagen, *Ind. Eng. Chem. Prod. Res. Dev.* 23, No.3, 483–489 (1984)]. Dicyandiamide is also stable in anhydrous and aqueous ammonia solutions [J. Gautney, Y. K. Kim, and P. M. Gagen, *Ind. Eng. Chem. Prod. Res. Dev.* 24, No.4, 645–650 (1985)].

Dicyandiamide is produced and marketed in Japan and more recently is being produced in West Germany and test marketed in the U.S. as a slow release nitrogen fertilizer. Dicyandiamide currently is not registered as a nitrification inhibitor in the U.S.. Although dicyandiamide offers a number of advantages over nitrapyrin and ETT in terms of fertilizer compatibility, like nitrapyrin and ETT, it is relatively expensive for use with fertilizer materials.

From the above information it is clear that although a large number of compounds have been identified and/or patented as nitrification inhibitors, there is no single inhibitor which meets all the needs of American agriculture. Thus, there is a need to find, identify, and/or develop new improved compounds for use as nitrification inhibitors.

SUMMARY OF THE INVENTION

The present invention relates to the use of two classes of N-Halamine compounds (N,N'-DIHALO-2-IMIDAZOLIDINONES and N-HALO-2-OXAZOLIDINONES) as urease and nitrification inhibitors in agricultural systems. Said N,N'-DIHALO-2-IMIDAZOLIDINONES having the structure illustrated below:

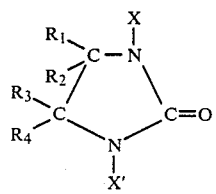

I wherein X and X' are each a halogen selected from the group consisting of chlorine, bromine, and mixtures thereof; and wherein R1, R2, R3, and R4 are each selected from the group consisting of hydrogen, C1-C4 alkyl, C1-C4 alkoxy, hydroxy, substituted phenyl, and mixtures thereof; provided, however, that not more than one of the substituents R1-R4 is hydrogen.

Said N-HALO-2-OXAZOLIDINONES having the structure illustrated below:

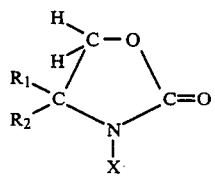

II wherein for urease inhibition X is chlorine or bromine, and for nitrification inhibition X is bromine; and wherein R1 is C1-C4 alkyl, and R2 is selected from the group consisting of C1-C4 alkyl, hydroxy, hydroxymethyl, C1-C4 alkoxy, and substituted phenyl (-Ph-R).

OBJECTS OF THE INVENTION

The principal object of Embodiment 1 of the present invention is to identify and characterize two classes of N-Halamine compounds as effective urease inhibitors in solution and agricultural soil systems which will, when admixed with urea or urea-containing fertilizers, prevent or greatly reduce the loss of ammoniacal nitrogen from agricultural soils resulting from the urease-induced hydrolysis of urea. With reference to the solution systems above, one example is to inhibit the decomposition of urea, which urea may be administered orally, or otherwise, into animals including humans for the treatment of kidney infections. The highly effective classes of inhibitors that we have discovered and which are herein identified and characterized are N,N'-DIHALO-2 IMIDAZOLIDINONES and N-HALO-2-OXAZOLIDINONES having structures as shown in I and II above.

The principal object of Embodiment 2 of the present invention is to identify and characterize two classes of N-Halamine compounds as effective nitrification inhibitors in agricultural soil systems which, when admixed with ammonia, ammonium containing fertilizers, natural fertilizers such as manures, or fertilizers such as urea which hydrolyze to ammonia or ammonium after application to the soil, will prevent or greatly reduce the loss of nitrogen by leaching and denitrification from agricultural soils resulting from the biological oxidation of ammonium-nitrogen to nitrate-nitrogen. The highly effective classes of inhibitors that we have discovered and which are herein identified and characterized are N,N'-DIHALO-2 IMIDAZOLIDINONES and N-HALO-2-OXAZOLIDINONES having structures as shown in I and II above.

A further object of Embodiment 2 of the present invention is to prevent or reduce nitrate pollution of groundwaters resulting from th nitrification of ammonium-nitrogen to nitrate-nitrogen in soil systems.

A still further object of Embodiment 2 of the present invention is to establish that some members of the N,N'-DIHALO-2-IMIDAZOLIDINONES and N-HALO-2-OXAZOLIDINONES classes of nitrification inhibitors are much more persistent and as a result far superior in inhibiting nitrification than the inhibitor dicyandiamide.

Still further and more general objects and advantages of both Embodiments 1 and 2, of the present invention, will appear from the more detailed description set forth in the following drawings, descriptions, and examples, it being understood, however, that this more detailed description is given by way of illustration and explanation only and not necessarily by way of limitation, since various changes therein may be made by those skilled in the art without departing from the true scope and spirit of the instant invention.

DESCRIPTION OF THE DRAWINGS

The present invention, together with further objects and advantages thereof, will be better understood from a consideration of the following descriptions taken in connection with the accompanying drawings in which:

FIG. 3 is useful for comparing inhibitors at each time interval. Results for dicyandiamide also are shown for comparison. See Embodiment 2, Examples VIII and X-XII, infra.

FIG. 4 is useful for showing the inhibition effect of each inhibitor over the 5-week incubation period. Results for dicyandiamide also are shown for comparison. See Embodiment 2, Examples VIII and X-XII, infra.

FIG. 5 is a line graph showing the nitrite concentration (mg/pot) after 1, 2, 3, 4, and 5 weeks incubation for the nitrification inhibition tests with the N,N'-DIHALO-2-IMIDAZOLIDINONES, 1-bromo-3-chloro-4,4,5,5-tetramethyl-2-imidazolidinone (ABC) and 1,3-dibromo-4,4,5,5-tetramethyl-2-imidazolidinone (AB), and the N-HALO-2-OXAZOLIDINONES, 3-chloro-4,4-dimethyl-2-oxazolidinone (I) and 3-bromo-4,4-dimethyl-2-oxazolidinone (IB) in a banded soil system at 25° C. Results for dicyandiamide also are shown for comparison. See Embodiment 2, Examples VIII and X–XII, infra.

Figure 1:
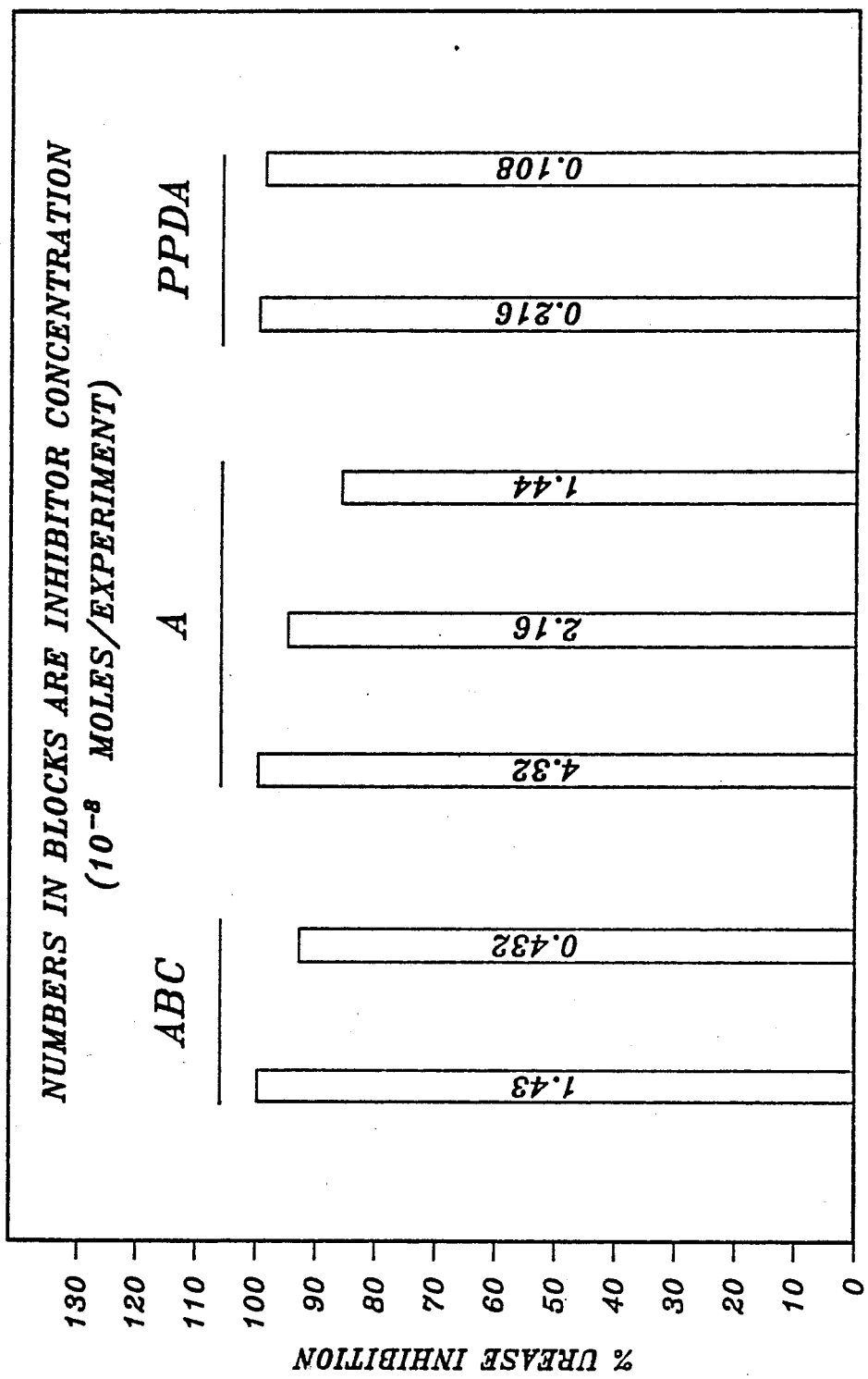
FIG. 1 is a bar graph showing the urease inhibition effect of the N,N'-DIHALO-2-IMIDAZOLIDINONES, 1-bromo-3-chloro-4,4,5,5-tetramethyl-2-imidazolidinone (ABC), and 1,3-dichloro-4,4,5,5-tetramethyl-2-imidazolidinone (A) in an aqueous system with purified Jack Bean urease. The results show the percent urease inhibition at different inhibitor concentrations. Results with PPDA also are given for comparison. See Embodiment 1, Examples I and II, infra.

For the sake of convenience and greater appreciation of the results of the discoveries leading to the present invention, as noted supra, more specific references to FIGS. 1–5 are combined with the appropriate discussion of pertinent data and presented therewith in Embodiment 1, Examples I to VI, infra and Embodiment 2, Examples VIII and X–XII, infra.

DESCRIPTION OF THE PREFERRED EMBODIMENTS

For ease and convenience of application, the N-Halamine compounds may be incorporated into solid fertilizers containing ammonium and/or urea or other fertilizer compounds, which hydrolyze to yield ammonium after application to the soil, by mixing, prilling, granulating, coating, or other means familiar to those knowledgeable in the art of producing and/or blending solid fertilizer materials. Similarly the N-Halamine compounds can be incorporated into anhydrous ammonia, and aqueous solutions and fluid fertilizers containing ammonium and/or urea or other nitrogen fertilizers which hydrolyze to yield ammonium after application to the soil by dissolving and/or suspending solid N-Halamine compounds in said anhydrous ammonia, aqueous solutions, and fluid fertilizers. The dissolution and suspending process may be aided by mechanical mixing, addition of suspending agents, or other means knowledgeable to those skilled in this art and generally acquainted with various methods and means for producing and/or blending fluid fertilizers. N-Halamine compounds for application to the soil can also be prepared in situ in solid or fluid fertilizers, including solutions or suspensions, by adding the precursor amine and free halogen source, e.g., NaOCl or Ca(OCl)2 etc., to said solid or fluid fertilizers before or during their application to the soil. N-Halamine compounds also can be applied directly to soils prior to or during fertilizer application by broadcasting solid N-Halamine compounds onto the soil or by dissolving N-Halamine compounds in water or other appropriate solvents and spraying the resultant inhibitor solution onto the soil. Similarly N-Halamine compounds can be prepared in situ in the soil by applying both the precursor amine and free halogen source to the soil.

TESTING METHODS

Embodiment 1: Urease activity of inhibitor test compounds may be evaluated either in aqueous or in soil systems. When aqueous systems are used, urea plus a test compound with possible urease inhibition activity and relatively pure urease enzyme are incubated together to determine the effects of the test compound on urease-catalyzed hydrolysis of urea. When soil systems are used, urea and the test compound are added to moist soil, and the urease enzyme is supplied from the soil. The main disadvantage of using soil systems is that the true activity of test compounds may be masked because of reactions between the test compound and soil. Thus, basic studies for understanding chemical structure-activity relationships are usually done in aqueous systems. However, soil systems must be used to determine the principal applicability of test compounds since soil can significantly modify the inhibitory effects of these compounds.

Test compounds cited in the examples, infra, were evaluated in aqueous or soil systems. Some of the test compounds were evaluated using both aqueous and soil systems. The test procedures are described below.

Aqueous System (pH Stat) Test Procedure: The aqueous system urease inhibition tests were conducted at 25° C using purified Jack Bean urease enzyme, 50,000–80,000 units per gram, a unit of urease will liberate 1 umole of NH3 from urea per minute at pH 7.0 at 25° C.

An appropriate amount of inhibitor [such as 37.0 uL (microliters) of a $1.169 \times 10^{(-3)}$ M (moles/liter) inhibitor solution] and 100 uL of a solution of 13.9130 mg Jack Bean urease enzyme in 10.00 mL of water were diluted to 25.00 mL. This combined solution was allowed to sit undisturbed at 23° C. for twenty (20) minutes. Then 20.0 uL of a preservative solution was added to prevent degradation of the urease enzyme during the course of the experiment. The preservative solution contained $5.655 \times 10^{-4}$ moles/liter ethylenediaminetetraacetic acid (disodium salt) and $1.166 \times 10^{-3}$) moles/liter dithiothreitol.

Immediately after the addition of the preservative solution to the inhibitor/urease solution, 800 uL of a 0.1246 M urea solution was added and a computer assisted titrimeter was started. This titrimeter maintained a constant pH of 6.97 during the course of the experiment by neutralizing the ammonia (resulting from urease hydrolysis of urea) with 0.01142 M hydrochloric acid (HCl). The volume (measured to 0.001 mL) of HCl added was automatically recorded every 15 seconds for up to 20.0 minutes or until a total volume of 2.500 mL of HCl was added.

Experiments also were conducted without inhibitor (blank) and with the inhibitor PPDA for comparison. The experiments were replicated, and the percent inhibition for each of the inhibitors at the various concentrations was calculated as follows:

$$\% \text{ inhibition} = (k_{inhibitor}/k_{blank}) \times 100 \qquad (4)$$

where $k_{inhibitor}$ and $k_{blank}$ are the average rates of HCl addition for the inhibitor and blank experiments, respectively. The rates of HCl addition were calculated by linear regression of the titration curves.

Soil System Test Procedure: The soil system test procedure used was a modification of the previous procedures of other researchers L. A. Douglas and J. M. Bremner, *Soil Biol. Biochem.* 3, 309–315 (1971) and J. M. Bremner and R. L. Mulvaney, "Urease Activity in Soils," *Soil Enzymes* 5, R. G. Burns, editor, Academic Press, 149–195 (1978)]. In this modified procedure powdered mixtures of urea and test compounds were applied in narrow bands in the soil rather than being mixed throughout the soil. The banded configuration also results in concentration gradients of urea, urea hydrolysis products, test compounds, and test compound decomposition products similar to those in the immediate vicinity of urea granules containing the test compounds. Another advantage of the banded configuration compared with mixing throughout the soil is that slightly soluble test compounds can be easily band applied, whereas it is difficult to achieve a known degree of mixing of a small quantity of slightly soluble test compound with soil. The banded configuration also enables testing for urease inhibition under realistic soil conditions prior to the development of techniques for cogranulating a wide range of test compounds with urea.

A detailed description of the banded soil testing procedure follows. Urease-active soil (Hastings silt loam) was moistened to a moisture content of 20 percent dry weight basis) and preincubated at room temperature for two days. Plexiglas containers (6×6×6 cm) were half filled with soil and packed to a bulk density of 1.0 g/cm. Urea (410 mg) or urea (410 mg) plus inhibitor (41 mg, thoroughly mixed with the urea) was distributed in a narrow band about 0.5 cm wide and 6 cm long on the soil surface. The containers then were filled with soil, again packing to a bulk density of 1.0 g/cm³. The containers were incubated at 25° C. for the desired reaction period, after which the containers were frozen to about −5° C. to stop urea hydrolysis. Immediately prior to extracting the remaining urea from the soil, said soil was allowed to thaw. Soil from each container was thoroughly mixed, and a 10-g sample was extracted with 100 ml of 2 M KCl containing phenylmercuric acetate to prevent urea hydrolysis during handling [L. A. Douglas and J. M. Bremner, Soil. Sci. Soc. Am. Proc. 34, 859–862 (1970)]. Urea in the extracts was determined colorimetrically as a measure of unhydrolyzed urea and the results expressed as percent unhydrolyzed urea-N.

Embodiment 2: The N-Halamine compounds were tested for nitrification inhibition using the soil testing procedure described below.

Mountainview silt loam soil was screened through a 2 mm sieve. Plexiglas containers (8×8×6 cm) were packed half full with the soil and packed to a bulk density of 1.0 g/cm³ and wetted to field capacity (approximately 20 weight percent moisture). The urea 410 mg per container) and inhibitor (41 mg per container) were added in a narrow band (0.5 cm wide X 6 cm long), and additional soil was added to fill the containers. The total amount of dry soil added was 384 g. The containers were incubated at 25° C. During incubation the containers were checked periodically for moisture loss and additional water added as needed to maintain moisture levels.

The individual containers were removed from the incubator at 1, 2, 3, 4, and 5 week intervals. After removal from the incubator the contents of the container were transferred to a plastic bag and thoroughly mixed. A 10-g sample of soil (dry basis) was taken from the bag and extracted with 100 ml of 2 N KCL. The extract was filtered through Whatman #41 filter paper and refrigerated until analyzed. Samples were analyzed for NO3-N- NO2-N- and urea-N using a colorimetric procedure. Some samples also were analyzed for NH4-N.

The percent nitrification inhibition was calculated according to the method of Bundy and Bremner [G. L. Bundy and J. M. Bremner, Soil Sci. Soc. Am. Proc. 37, 396–398 (1973)]

% nitrification inhibition = [(C-S)/C] × 100 where C=net amount of NO3-N produced in the control (no inhibitor added), and S=net amount of NO3-N produced in the inhibitor treated sample.

EXAMPLES

In order that those skilled in the art may better understand how the various embodiments of the present invention may be utilized and incorporated into various means and methods for the practice thereof, the following examples are given by way of illustration and not necessarily by way of limitation. As noted supra, Examples I to VI relate to Embodiment 1 of the instant invention and Examples VII to XII relate to Embodiment 2.

EXAMPLE I

The N,N′-DIHALO-2-IMIDAZOLIDINONE, 1-bromo-3-chloro-4,4,5,5-tetramethyl-2-imidazolidinone (ABC), having the structure

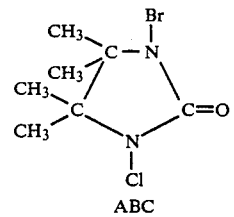

ABC was tested for its ability to inhibit urease in an aqueous system by the pH stat method described above. Inhibitor concentrations of $1.43 \times 10^{-8}$ and $4.32 \times 10^{-9}$ moles of inhibitor per experiment were used. The results given in Table I below and plotted in FIG. 1 showed that 100 and 93 percent urease inhibition were obtained at the upper and lower inhibitor concentrations, respectively compared to 100% and 99% inhibition for PPDA at concentrations of $2.16 \times 10^{-9}$ and $1.08 \times 10^{-9}$ moles per experiment. This example clearly shows that 1-bromo-3-chloro-4,4,5,5-tetramethyl-2-imidazolidinone is an effective urease inhibitor in solution systems, its effectiveness approaching that of the well known inhibitor PPDA.

TABLE I

| Results of Urease Inhibition Tests With N,N′-Dihalo-2-Imidazolidinones in an Aqueous System at 25° C. | | |
|---|---|---|
| Inhibitor | Inhibitor concentration [10($^{-8}$) moles/experiment] | % urease inhibition |
| ABC | 1.430 | 100.00 |
| ABC | 0.432 | 93.00 |
| A | 4.320 | 100.00 |
| A | 2.160 | 95.00 |
| A | 1.440 | 86.00 |
| PPDA | 0.216 | 100.00 |
| PPDA | 0.108 | 99.00 |

EXAMPLE 11

The N,N′-DIHALO-2-IMIDAZOLIDINONE, 1,3-dichloro-4.4,5.5-tetramethyl-2-imidazolidinone (A), having the structure

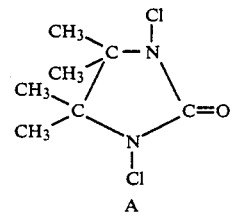

A was tested for its ability to inhibit urease in an aqueous system by the pH stat method described above. Inhibitor concentrations of $4.32 \times 10^{-8}$, $2.16 \times 10^{-8}$, and $1.44 \times 10^{-8}$ moles per experiment were used. The results given in Table I supra and plotted in FIG. 1 showed that 100 percent, 95 percent, and 86 percent ureas inhibition was obtained at each of the three inhibitor concentrations, respectively. This compares to 100 percent and 99 percent inhibition for PPDA at concentrations of $2.16 \times 10^{-9}$ and $1.08 \times 10^{-9}$ moles per experiment. This example clearly shows that 1-3-dichloro 4,4,5,5-tetramethyl-2-imidazolidinone is an effective urease inhibitor in solution systems.

EXAMPLE III

Figure 2:
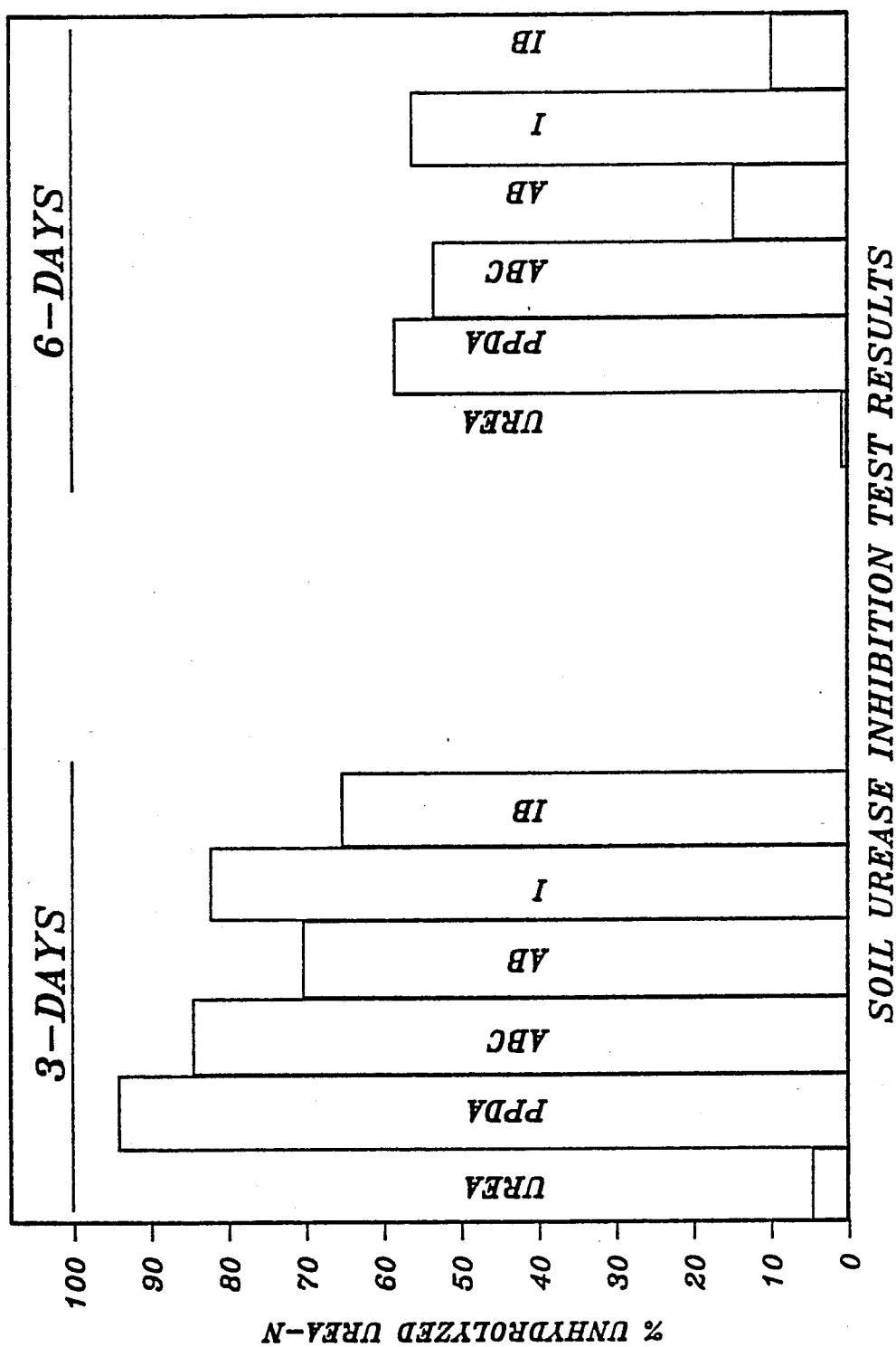
FIG. 2 is a bar graph showing the urease inhibition effect of the N,N'-DIHALO-2-IMIDAZOLIDINONES, 1-bromo-3-chloro-4,4,5,5-tetramethyl-2-imidazolidinone (ABC), and (1,3-dibromo-4,4,5,5-tetramethyl-2-imidazolidinone (AB), and the N-HALO-2-OXAZOLIDINONES, 3-chloro-4,4-dimethyl-2-oxazolidinone (I), and 3-bromo-4,4-dimethyl-2-oxazolidinone (IB) in a banded soil system at 25° C. The results show the percent unhydrolyzed urea- N after 3- and 6-days incubation. Results for PPDA and for urea without inhibitor also are shown for comparison. See Embodiment 1, Examples III-VI, infra.

The N,N'-DIHALO-2-IMIDAZOLIDINONE, 1-bromo-3-chloro-4,4,5,5-tetramethyl-2-imidazolidinone (ABC), having the structure shown in III above was tested for its ability to inhibit urease activity in soil systems by the soil testing procedure described above. The inhibitor PPDA also was tested for comparison. The results given in Table II below and plotted in FIG. 2 show that after 3 and 6 days incubation at 25° C., 84.7 and 53.7 percent of the urea-N remained unhydrolyzed compared to 4.9 and 1.0 for the control (urea without inhibitor) and 94.3 and 58.7 for the inhibitor PPDA. These data clearly show that 1-bromo-3-chloro-4,4,5,5-tetramethyl-2-imidazolidinone is a highly effective urease inhibitor in soil systems, its effectiveness approaching that of the well known urease inhibitor PPDA.

TABLE II

| | Soil Urease Inhibition Test Results With N-Halamine Compounds[a] | | | |
|---|---|---|---|---|
| | 3 days % unhydrolyzed | | 6 days % unhydrolyzed | |
| Inhibitor | PPM urea-N | urea-N | PPM urea-N | urea-N |
| Soil only | 0.4 | 0.45 | 0.7 | 0.79 |
| Soil + urea | 4.3 | 4.86 | 0.9 | 1.02 |
| PPDA | 83.5 | 94.31 | 52 | 58.73 |
| ABC | 75.0 | 84.71 | 47.5 | 53.65 |
| AB | 62.5 | 70.59 | 13.3 | 15.02 |
| I | 73.0 | 82.45 | 50.0 | 56.47 |
| IB | 58.0 | 65.51 | 8.9 | 10.05 |

[a]The plexiglas containers measured 6 × 6 × 6 cm. Hastings silt loam soil was utilized and packed to a bulk density of 1 gm/cm$^3$ dry basis. The soil was wet to near field capacity (20% moisture) and 260 g of wetted soil (216 g dry soil) was added per container. The containers were packed half full, urea and inhibitor were added, and the remaining soil was added. The amount of urea added = 410 mg (191.2469 mg urea-N).

EXAMPLE IV

The N,N'-DIHALO-2-IMIDAZOLIDINONE, 1,3-dibromo-4,4,5,5-tetramethyl-2-imidazolidinone (AB), having the structure

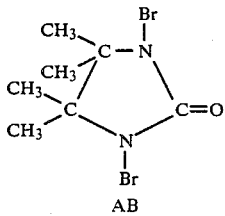

AB was tested for its ability to inhibit urease activity in soil systems by the soil testing procedure described above. The inhibitor PPDA also was tested for comparison. The results given in Table II supra and plotted in FIG. 2 showed that after 3 and 6 days incubation at 25° C., 70.6 and 15.0 percent of the urea-N remained unhydrolyzed compared to 4.9 and 1.0 for the control (urea without inhibitor) and 94.3 and 58.7 for the inhibitor PPDA. These data clearly show that 1,3-dibromo-4,4,5,5-tetramethyl-2-imidazolidinone is a highly effective urease inhibitor in soil systems even though it is somewhat less effective than the well known urease inhibitor PPDA and 1-bromo-3 chloro-4,4,5,5-tetramethyl-2 -imidazolidinone (Example III, supra).

EXAMPLE V

The N-HALO-2-OXAZOLIDINONE, 3-chloro-4,4-dimethyl-2-oxazolidinone (I), having the structure

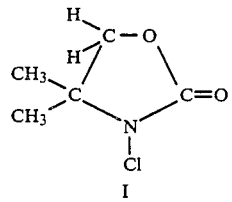

I was tested for its ability to inhibit urease activity in soil systems by the soil testing procedure described above. The inhibitor PPDA also was tested for comparison. The results given in Table II supra and plotted in FIG. 2 show that after 3 and 6 days incubation at 25° C., 82.4 and 56.5 percent of the urea-N remained unhydrolyzed compared to 4.9 and 1.0 for the control (urea without inhibitor) and 94.3 and 58.7 for the inhibitor PPDA. These data clearly show that 3-chloro-4,4-dimethyl-2-oxazolidinone is a highly effective urease inhibitor in soil systems, its effectiveness approaching that of the well known urease inhibitor PPDA.

EXAMPLE VI

The N-HALO-2-OXAZOLIDINONE, 3-bromo-4,4-dimethyl-2-oxazolidinone (IB), having the structure

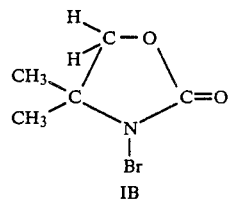

IB was tested for its ability to inhibit urease activity in soil systems by the soil testing procedure described above. The inhibitor PPDA also was tested for comparison. The results given in Table II supra and plotted in FIG. 2 show that after 3 and 6 days incubation at 25° C., 65.5 and 10.0 percent of the urea-N remained unhydrolyzed compared to 4.9 and 1.0 for the control (urea without inhibitor) and 94.3 and 58.7 for the inhibitor PPDA. These data clearly show that 3-bromo-4,4-dimethyl-2-oxazolidinone is a highly effective urease inhibitor in soil systems even though it is somewhat less effective than the well known inhibitor PPDA and 3-chloro-4,4-dimethyl-2-oxazolidinone (Example V, supra).

EXAMPLE VII

The N,N'-DIHALO-2-IMIDAZOLIDINONE, 1-bromo-3-chloro-4,4,5,5-tetramethyl-2-imidazolidinone (ABC), having the structure shown in III above was tested for its ability to inhibit nitrification in soils by the soil testing method described above except no samples were taken prior to the end of the 5-week incubation Period and no dicyandiamide was tested for comparison. Samples were not analyzed for nitrite. The results showed that 85.6 percent nitrification inhibition was obtained with 1-bromo-3-chloro-4,4,5,5-tetramethyl-2-imidazolidinone compared to 0 percent for urea without inhibitor. These data clearly show that 1-bromo-3-chloro-4,4,5,5-tetramethyl-2-imidazolidinone is an effective nitrification inhibitor in soil systems.

EXAMPLE VIII

Figure 3:
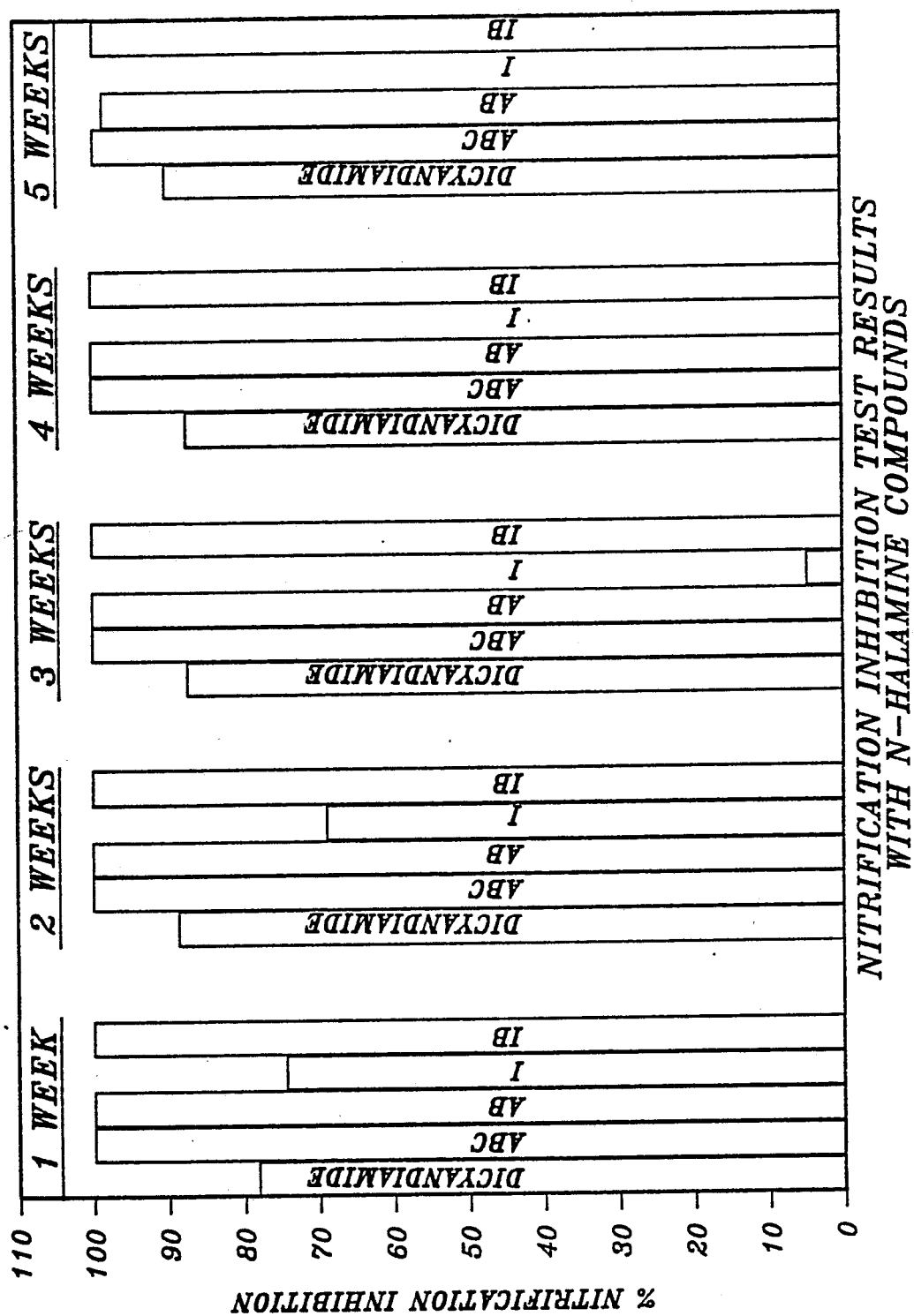
FIG. 3 is a bar graph showing the nitrification inhibition effect of the N,N'-DIHALO-2-IMIDAZOLIDINONES, 1-bromo-3-chloro-4,4,5,5 tetramethyl-2-imidazolidinone (ABC) and (1,3-dibromo-4,4,5,5-tetramethyl-2-imidazolidinone (AB), and the N-HALO-2-OXAZOLIDINONES, 3-chloro-4,4-dimethyl-2-oxazolidinone (I) and 3-bromo-4,4-dimethyl-2-oxazolidinone (IB) in a banded soil system at 25° C. The results show the percent nitrification inhibition after 1, 2, 3, 4, and 5 weeks incubation.
Figure 4:
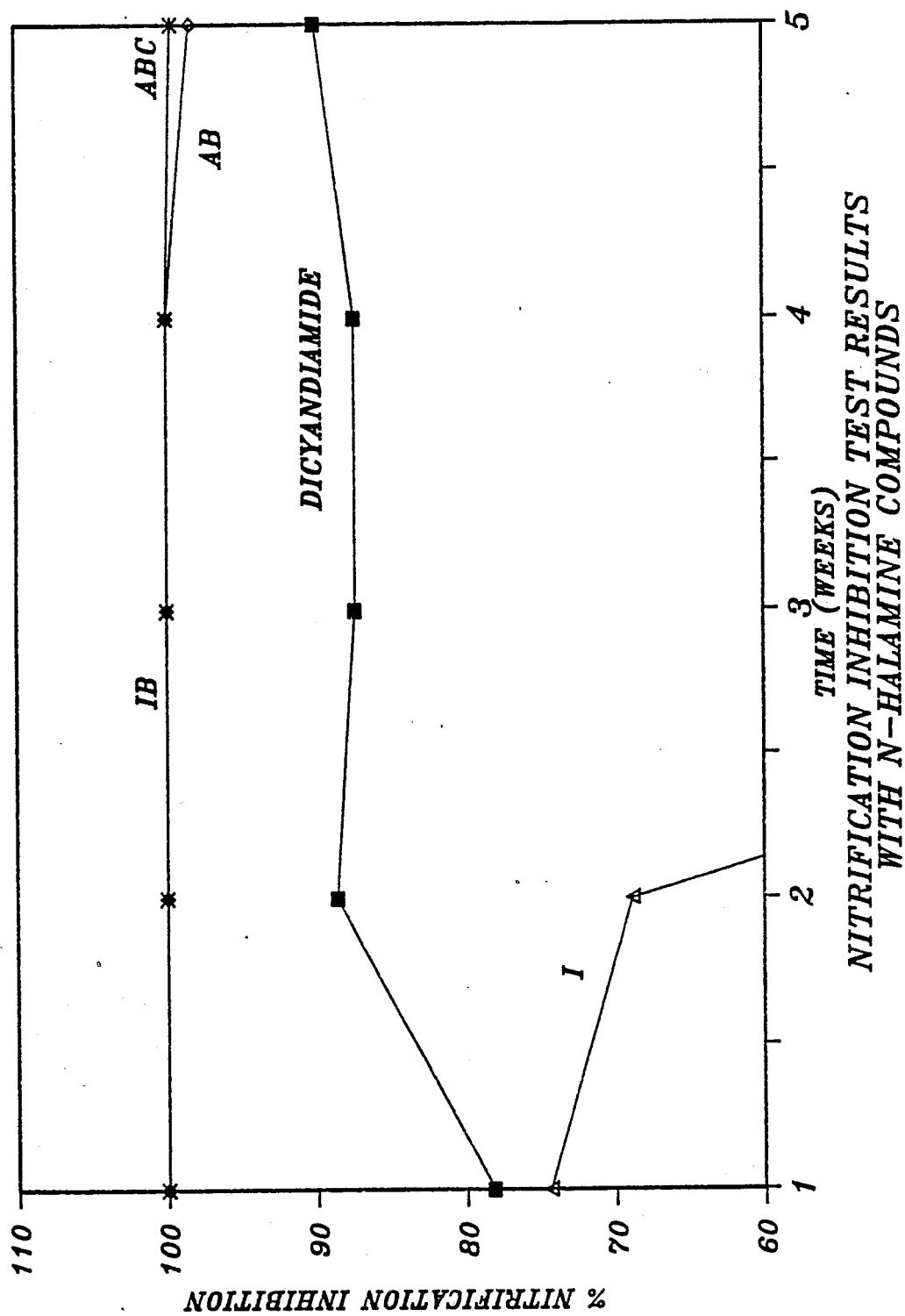
FIG. 4 is a line graph showing the nitrification inhibition effect of the N,N'-DIHALO-2-IMIDAZOLIDINONES, 1-bromo-3-chloro-4,4,5,5-tetramethyl-2-imidazolidinone (ABC) and 1,3-dibromo-4,4,5,5-tetramethyl-2-imidazolidinone (AB), and the N-HALO-2-OXAZOLIDINONES, 3-chloro-4,4- dimethyl-2-oxazolidinone (I) and 3-bromo-4,4-dimethyl-2-oxazolidinone (IB) in a banded soil system at 25° C. The results show the percent nitrification inhibition after 1, 2, 3, 4, and 5 weeks incubation.

The N,N'-DIHALO-2-IMIDAZOLIDINONE, 1-bromo-3-chloro-4,4,5,5-tetramethyl-2-imidazolidinone (ABC), having the structure shown in III above was tested for its ability to inhibit nitrification in soils by the soil testing method described above. The inhibitor dicyandiamide and urea without inhibitor were tested for comparison. The results given in Table III below and plotted in FIGS. 3 and 4 show that even after 5 weeks incubation at 25° C., 99.6 percent nitrification inhibition was obtained with 1-bromo-3-chloro-4,4,5,5-tetramethyl-2-imidazolidinone compared to 90 percent inhibition for the dicyandiamide treatment and 0 percent for the urea without inhibitor. Nitrite accumulation in the soil during the 5 weeks incubation (Table III and FIG. 5) was greater with 1-bromo-3-chloro-4,4,5,5-tetramethyl-2-imidazolidinone than with dicyandiamide but was still well within plant tolerance levels. These data clearly show that compound 1-bromo-3-chloro-4,4,5,5-tetramethyl-2-imidazolidinone is an effective nitrification inhibitor in soil systems, its effectiveness being greater than that of the well known inhibitor dicyandiamide at each of the five weekly sampling intervals. Comparison of Examples VII and VIII illustrates how the nitrification potential of soils, even soils of the same classification, can vary.

2-imidazolidinone is an effective nitrification inhibitor in soil systems; however, it is not as effective as 1-bromo-3-chloro-4,4,5,5-tetramethyl-2-imidazolidinone (Example VII, supra).

EXAMPLE X

The N,N'-DIHALO-2-IMIDAZOLIDINONE, 1,3-dibromo-4,4,5,5-tetramethyl-2-imidazolidinone (AB), having the structure shown in V above was tested for its ability to inhibit nitrification in soils by the soil testing method described above. The inhibitor dicyandiamide and urea without inhibitor were tested for comparison. The results given in Table III supra and plotted in FIGS. 3 and 4 show that even after 5 weeks incubation at 25° C., 98.3 percent nitrification inhibition was obtained with 1,3-dibromo-4,4,5,5-tetramethyl-2-imidazolidinone compared to 90 percent inhibition for the dicyandiamide treatment and 0 percent for the urea without inhibitor. Nitrite accumulation in the soil during the 5 weeks incubation (Table III and FIG. 5) was greater with 1,3-dibromo-4,4,5,5-tetramethyl-2-imidazolidinone than with dicyandiamide but was still well within plant tolerance levels. These data clearly show that 1,3-dibromo-4,4,5,5-tetramethyl-2-imidazolidinone is an effective nitrification inhibitor in soil systems, its effectiveness being greater than that of the well known inhibitor dicyandiamide at each of the five weekly sampling intervals.

EXAMPLE XI

TABLE III

Nitrification Inhibition Test Results With N-Halamine Compounds[a]

| Inhibitor | 1 week | | | 2 weeks | | | 3 weeks | | |
|---|---|---|---|---|---|---|---|---|---|
| | Net mg $NO_3-N$ | Net mg $NO_2-N$ | % inhibition | Net mg $NO_3-N$ | Net mg $NO_2-N$ | % inhibition | Net mg $NO_3-N$ | Net mg $NO_2-N$ | % inhibition |
| Urea | 21.1 | 1.34 | 0.0 | 155.5 | 0.12 | 0.0 | 180.1 | −0.02 | 0.0 |
| Dicyandiamide | 4.6 | 0.17 | 78.2 | 17.7 | 0.19 | 88.6 | 22.7 | 0.01 | 87.4 |
| ABC | 0.0 | −0.05 | 100.0 | 0.0 | 0.04 | 100.0 | 0.0 | 0.08 | 100.0 |
| AB | 0.0 | −0.05 | 100.0 | 0.0 | 0.04 | 100.0 | 0.0 | 0.03 | 100.0 |
| I | 5.4 | 0.28 | 74.4 | 48.4 | 0.49 | 68.9 | 171.3 | 0.07 | 4.9 |
| IB | 0.0 | −0.02 | 100.0 | 0.0 | 0.06 | 100.0 | 0.0 | 0.12 | 100.0 |

| Inhibitor | 4 weeks | | | 5 weeks | | |
|---|---|---|---|---|---|---|
| | Net mg $NO_3-N$ | Net mg $NO_2-N$ | % inhibition | Net mg $NO_3-N$ | Net mg $NO_2-N$ | % inhibition |
| Urea | 180.5 | 0 | 0.0 | 184.7 | −0.02 | 0.0 |
| Dicyandiamide | 22.7 | 0.01 | 87.4 | 18.4 | −0.02 | 90.0 |
| ABC | 0.0 | 1.68 | 100.0 | 0.8 | 1.67 | 99.6 |
| AB | 0.0 | 0.82 | 100.0 | 3.1 | 2.63 | 98.3 |
| I | 185.5 | 0.02 | −2.8 | 187.4 | −0.01 | −1.5 |
| IB | 0.0 | 0.52 | 100.0 | 0.8 | 2.64 | 99.6 |

[a]Concentrations are in net mg/container. All containers had 384 g soil (dry), 410 mg urea (188.6 mg N) and 41 mg inhibitor. Samples were extracted 10 g → 100 mls 2N KCl. The formulas used for calculations are:

$$\% \text{ inhibition} = \frac{C - S}{C} \times 100$$

where C = net $NO_3-N$ produced in control (no inhibitor), S = net $NO_3-N$ produced in inhibitor treated sample, net $NO_3-N$ = ($NO_3-N$) − (soil $NO_3-N$), and net $NO_2-N$ = ($NO_2-N$) − (soil $NO_2-N$). Values are averages of two replicate samples.

EXAMPLE IX

The N,N'-DIHALO-2-IMIDAZOLIDINONE, 1,3-dichloro-4,4,5,5-tetramethyl-2-imidazolidinone (A), having the structure shown in IV above was tested for its ability to inhibit nitrification in soils by the soil testing method described above except no samples were taken prior to the end of the 5-week incubation period, and no dicyandiamide was tested for comparison. Samples were not analyzed for nitrite. The results showed that 41.8 percent nitrification inhibition was obtained with 1,3-dichloro-4,4,5,5-tetramethyl-2-imidazolidinone compared to 0 percent for urea without inhibitor. These data clearly show that 1,3-dichloro-4,4,5,5-tetramethyl- The N-HALO-2-OXAZOLIDINONE, 3-chloro-4,4-dimethyl-2-oxazolidinone (I), having the structure shown in VI above was tested for its ability to inhibit nitrification in soils by the soil testing method described above. The inhibitor dicyandiamide and urea without inhibitor were tested for comparison. The results given in Table III supra and plotted in FIGS. 3 and 4 show that after 1 week incubation at 25° C., 74.4 percent nitrification inhibition was obtained with 3-chloro-4,4-dimethyl 2-oxazolidinone compared to 78.2 percent inhibition for the dicyandiamide treatment, 100 percent inhibition for the 3-bromo-4,4-dimethyl-2-oxazolidinone treatment, and 0 percent for the urea without inhibitor. At subsequent weekly sampling intervals the percent nitrification inhibition for 3-chloro-4,4-dimethyl-2-oxazolidinone became much less than that for dicyandiamide and 3-bromo-4,4-dimethyl-2-oxazolidinone. After three weeks the nitrification inhibition effect of 3-chloro-4,4-dimethyl-2-oxazolidinone was almost completely exhausted. This example, in combination with Example XII, infra, demonstrates that the chloro-substituted N-halo-2-oxazolidinones are much less effective and persistent nitrification inhibitors than the bromo-substituted N-halo-2-oxazolidinones.

EXAMPLE XII

The N-HALO-2-OXAZOLIDINONE, 3-bromo-4,4-dimethyl-2-oxazolidinone (IB), having the structure shown in VII above was tested for its ability to inhibit nitrification in soils by the soil testing method described above. The inhibitor dicyandiamide and urea without inhibitor were tested for comparison. The results given in Table III supra and plotted in FIGS. 3 and 4 show that even after five weeks incubation at 25° C., 99.6 percent nitrification inhibition was obtained with 3-bromo-4,4-dimethyl-2-oxazolidinone compared to 90 percent inhibition for the dicyandiamide treatment, 0 percent inhibition for the 3-chloro-4,4-dimethyl-2-oxazolidinone treatment, and 0 percent for the urea without inhibitor. Nitrite accumulation in the soil during the five weeks incubation (Table III supra and FIG. 5) was greater with 3-bromo 4,4-dimethyl-2-oxazolidinone than with dicyandiamide but was still well within plant tolerance levels. These data clearly show that 3-bromo-4,4-dimethyl-2-oxazolidinone is an effective nitrification inhibitor in soil systems, its effectiveness being greater than that of the well known inhibitor dicyandiamide and 3-chloro-4,4-dimethyl-2-oxazolidinone at each of the five weekly sampling intervals. As is noted above, the results of this example in combination with Example XI, supra, demonstrate that the bromo-substituted N-halo-2-oxazolidinones are much more effective and persistent nitrification inhibitors than the chloro-substituted N-halo-2-oxazolidinones.

INVENTION PARAMETERS

After sifting and winnowing through the data supra, as well as other results and operation of our new and novel invention for the use of N-Halamine compounds to inhibit the urease catalyzed hydrolysis of urea to ammonia and carbonic acid in solution and soil systems and to inhibit the nitrification of ammonium nitrogen in soil systems; we now present the principal operating parameters and variables for their use, it being understood that other variables, as considered and discussed supra may alone, or in various combinations be additional viable operational considerations and parameters.

For the use of N-Halamine compounds to inhibit the urease catalyzed hydrolysis of urea, the N-Halamine concentration in the urea containing fertilizer can range from 0.01 to 10 weight percent of the urea in the fertilizer with 0.5 to 5 weight percent being the preferred concentration, and 0.5-2 weight percent being the most preferred concentration. The concentration of urea-N in the fertilizer can range up to 47 weight percent, it being understood; however, that urease inhibitors have most utility in fertilizers of high urea content (28-47 weight percent urea-N).

For the use of N-Halamine compounds to inhibit the nitrification of ammonium nitrogen, or as dual inhibitors to inhibit both the urease catalyzed hydrolysis of urea and the nitrification of ammonium nitrogen, the N Halamine concentration in the urea containing fertilizer can range from 0.01 to 10 weight percent of the ammonium nitrogen and/or urea nitrogen (expressed as urea) in the fertilizer with 0.5 to 5 weight percent being the preferred concentration, and 0.5-2 weight percent being the most preferred concentration. The concentration of ammonium-N, and/or other fertilizers that hydrolyze to ammonium-N and/or urea-N in the fertilizer can range up to 83 weight percent N, it being understood; however, that urease inhibitors and nitrification inhibitors have most utility in fertilizers of high urea and ammonium nitrogen content (28-83 weight percent ammonium-N and/or urea-N).

Although urease and/or nitrification inhibitors are most useful in fertilizers with high urea and ammonium nitrogen content, which contain only nitrogen as a fertilizer component, the practice of fertilizer application and use often makes it desirable to mix or blend urea and/or ammonium containing nitrogen fertilizers with phosphorous and/or potassium containing fertilizers and/or micronutrients. For these applications the urea and/or ammonium fertilizers containing N-Halamine compounds can contain up to 25 weight percent $P_2O_5$ and/or 30 weight percent $K_2O$, and/or 5 weight percent micronutrients.

While we have shown and described particular embodiments of our invention, modifications and variations thereof will occur to those skilled in the art. We wish it to be understood, therefore, that the appended claims are intended to cover such modifications and variations which are within the true scope and spirit of our invention.

What we claim as new and desire to secure by Letters Patent of the U.S. is:

1. A method for controlling enzymatic decomposition of urea juxtaposed soil systems or in vivo solution systems, said enzymatic decomposition of said urea being to ammonia and carbonic acid and being due to the action of the enzyme urease thereupon, said method consisting essentially of exposing said enzyme to relatively small predetermined amounts of at least one N,N'-DIHALO-2-IMIDAZOLIDINONE of the formula

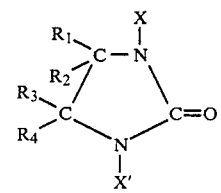

wherein X and X' are halogens selected from the group consisting of chlorine, bromine, and mixtures thereof; wherein R1, R2, R3, and R4 are selected from the group consisting of hydrogen, C1-C4 alkyl, C1-C4 alkoxy, hydroxy, substituted phenyl, and mixtures thereof; and wherein not more than one of the substituents R1-R4 is hydrogen.

2. The method of claim 1 wherein said N,N'-DIHALO-2-IMIDAZOLIDINONE is 1,3-dibromo-4,4,5,5-tetramethyl-2-imidazolidinone of the formula

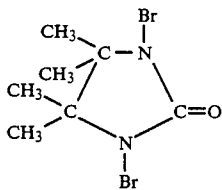

3. The method of claim 1 wherein said N,N'-DIHALO-2-IMIDAZOLIDINONE is 1,3-dichloro-4,4,5,5-tetramethyl-2-imidazolidinone of the formula

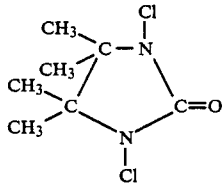

4. The method of claim 1 wherein said N,N'-DIHALO-2-IMIDAZOLIDINONE is 1-bromo-3-chloro-4,4,5,5-tetramethyl-2-imidazolidinone of the formula

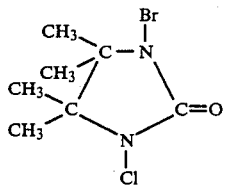

5. A method for controlling enzymatic decomposition of urea juxtaposed soil systems or in vivo solution systems, said enzymatic decomposition of said urea being to ammonia and carbonic acid and being due to the action of the enzyme urease thereupon, said method consisting essentially of exposing said enzyme to relatively small predetermined amounts of at least one N-HALO-2-OXAZOLIDINONE of the formula

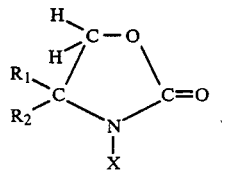

wherein X is selected from the group consisting of chlorine or bromine; wherein R1 is C1-C4 alkyl; and wherein R2 is selected from the group consisting of C1-C4 alkyl, hydroxy, hydroxymethyl, C1-C4 alkoxy, and substituted phenyl (-Ph-R).

6. The method of claim 5 wherein said N-HALO-2-OXAZOLIDINONE is 3-bromo-4,4-dimethyl-2-oxazolidinone of the formula

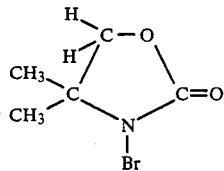

7. The method of claim 5 wherein said N-HALO-2-OXAZOLIDINONE is 3-chloro-4,4-dimethyl-2-oxazolidinone of the formula

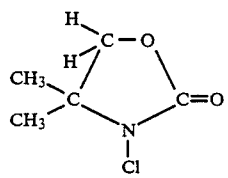

8. A method for controlling enzymatic decomposition of urea juxtaposed soil systems or in vivo solution systems, said enzymatic decomposition of said urea being to ammonia and carbonic acid and being due to the action of the enzyme urease thereupon, said method consisting essentially of exposing said enzyme to relatively small predetermined amounts of:

(a) at least one N,N'-DIHALO-2-IMIDAZOLIDINONE of the formula

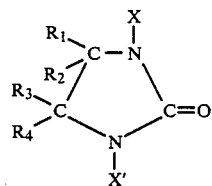

wherein X and X' are halogens selected from the group consisting of chlorine, bromine, and mixtures thereof; wherein R1, R2, R3, and R4 are selected from the group consisting of hydrogen, C1-C4 alkyl, C1-C4 alkoxy, hydroxy, substituted phenyl, and mixtures thereof; and wherein not more than one of the substituents R1-R4 is hydrogen, and (b) at least one N-HALO-2-OXAZOLIDINONE of the formula

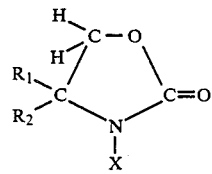

wherein X is selected from the group consisting of chlorine or bromine; wherein R1 is C1-C4 alkyl; and wherein R2 is selected from the group consisting of C1-C4 alkyl, hydroxy, hydroxymethyl, C1-C4 alkoxy, and substituted phenyl (-Ph-R).

9. The method for inhibiting the nitrification of ammonium nitrogen juxtaposed soil systems, said ammonium nitrogen derived from the group consisting of natural sources, ammonia, ammonium containing fertilizer, urea containing fertilizer, or mixtures thereof, said ammonium nitrogen derived from said urea containing fertilizer being due to the hydrolysis of said urea to said ammonium nitrogen subsequent to juxtapositioning of said urea containing fertilizer with said soil systems, said nitrification of ammonium nitrogen being to nitrite and nitrate and being due to the action of nitrosomonas bacteria on ammonium nitrogen and nitrobacter bacteria on nitrite nitrogen, said method consisting essentially of exposing said bacteria to relatively small predetermined amounts of at least one N,N'-DIHALO-2-IMIDAZOLIDINONE of the formula

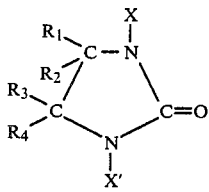

wherein X and X' are halogens selected from the group consisting of chlorine, bromine, and mixtures thereof; wherein R1, R2, R3, and R4 are selected from the group consisting of hydrogen, C1-C4 alkyl, C1-C4 alkoxy, hydroxy, substituted phenyl, and mixtures thereof; and wherein not more than one of the substituents R1-R4 is hydrogen.

10. The method of claim 9 wherein said N,N'-DIHALO-2-IMIDAZOLIDINONE is 1,3-dibromo-4,4,5,5-tetramethyl-2-imidazolidinone of the formula

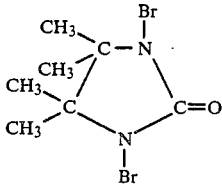

11. The method of claim 9 wherein said N,N'-DIHALO-2-IMIDAZOLIDINONE is 1,3-dichloro-4,4,5,5-tetramethyl-2-imidazolidinone of the formula

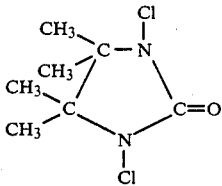

12. The method of claim 9 wherein said N,N'-DIHALO-2-IMIDAZOLIDINONE is 1-bromo-3-chloro-4,4,5,5-tetramethyl-2-imidazolidinone of the formula

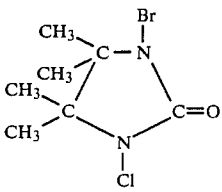

13. The method for inhibiting the nitrification of ammonium nitrogen juxtaposed soil systems, said ammonium nitrogen derived from the group consisting of natural sources, ammonia, ammonium containing fertilizer, urea containing fertilizer, or mixtures thereof, said ammonium nitrogen derived from said urea containing fertilizer being due to the hydrolysis of said urea to said ammonium nitrogen subsequent to juxtapositioning of said urea containing fertilizer with said soil systems, said nitrification of ammonium nitrogen being to nitrite and nitrate and being due to the action of nitrosomonas bacteria on ammonium nitrogen and nitrobacter bacteria on nitrite nitrogen, said method consisting essentially of exposing said bacteria to relatively small predetermined amounts of at least one N-HALO-2-OXAZOLIDINONE of the formula

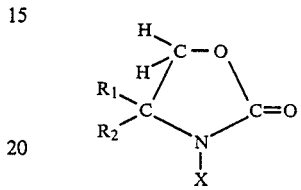

wherein X is bromine; wherein R1 is C1-C4 alkyl; and wherein R2 is selected from the group consisting of C1-C4 alkyl, hydroxy, hydroxymethyl, C1-C4 alkoxy, and substituted phenyl (-Ph-R).

14. The method of claim 13 wherein said N-HALO-2-OXAZOLIDINONE is 3-bromo-4,4-dimethyl-2-oxazolidinone of the formula

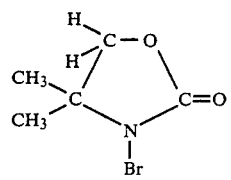

15. The method for inhibiting the nitrification of ammonium nitrogen juxtaposed soil systems, said ammonium nitrogen derived from the group consisting of natural sources, ammonia, ammonium containing fertilizer, urea containing fertilizer, or mixtures thereof, said ammonium nitrogen derived from said urea containing fertilizer being due to the hydrolysis of said urea to said ammonium nitrogen subsequent to juxtapositioning of said urea containing fertilizer with said soil systems, said nitrification of ammonium nitrogen being to nitrite and nitrate and being due to the action of nitrosomonas bacteria on ammonium nitrogen and nitrobacter bacteria on nitrite nitrogen, said method consisting essentially of exposing said bacteria to relatively small predetermined amounts of:

(a) at least one N,N'-DIHALO-2-IMIDAZOLIDINONE of the formula

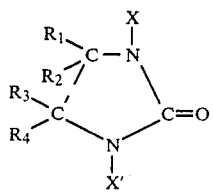

wherein X and X' are halogens selected from the group consisting of chlorine, bromine, and mixtures thereof; wherein R1, R2, R3, and R4 are selected from the group consisting of hydrogen, C1-C4 alkyl, C1-C4 alkoxy, hydroxy, substituted phenyl, and mixtures thereof; and wherein not more than one of the substituents R1-R4 is hydrogen, and (b) at least one N-HALO-2-OXAZOLIDINONE of the formula

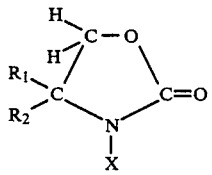

wherein X is bromine; wherein R1 is C1-C4 alkyl; and wherein R2 is selected from the group consisting of C1-C4 alkyl, hydroxy, hydroxymethyl, C1-C4 alkoxy, and substituted phenyl (-Ph-R).

16. A method for substantially simultaneously:
(a) controlling enzymatic decomposition of urea juxtaposed soil systems, said enzymatic decomposition of urea being to ammonia and carbonic acid and being due to the action of the enzyme urease thereupon, and
(b) inhibiting the nitrification of ammonium nitrogen juxtaposed soil systems, said nitrification of ammonium nitrogen being to nitrite and nitrate and being due to the action of nitrosomonas bacteria on ammonium nitrogen and nitrobacter bacteria on nitrite nitrogen;
said method consisting essentially of exposing said enzyme and said bacteria to relatively small predetermined amounts of at least one N,N'-DIHALO-2-IMIDAZOLIDINONE of the formula

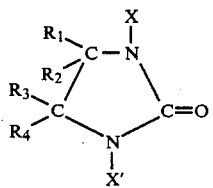

wherein X and X' are halogens selected from the group consisting of chlorine, bromine, and mixtures thereof; wherein R1, R2, R3, and R4 are selected from the group consisting of hydrogen, C1-C4 alkyl, C1-C4 alkoxy, hydroxy, substituted phenyl, and mixtures thereof; and wherein not more than one of the substituents R1-R4 is hydrogen.

17. The method of claim 16 wherein said N,N'-DIHALO-2-IMIDAZOLIDINONE is 1,3-dibromo-4,4.5,5-tetramethyl-2-imidazolidinone of the formula

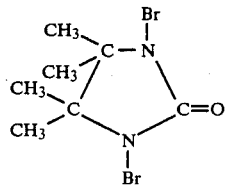

18. The method of claim 16 wherein said N,N'-DIHALO-2-IMIDAZOLIDINONE is 1,3-dichloro-4,4.5,5-tetramethyl-2-imidazolidinone of the formula

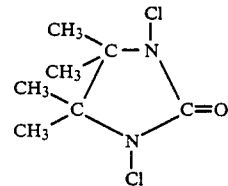

19. The method of claim 16 wherein said N,N'-DIHALO-2-IMIDAZOLIDINONE is 1-bromo-3-chloro-4,4,5,5-tetramethyl-2-imidazolidinone of the formula

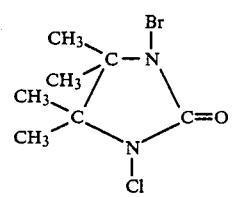

20. A method for simultaneously:
(a) controlling enzymatic decomposition of urea juxtaposed soil systems, said enzymatic decomposition of urea being to ammonia and carbonic acid and being due to the action of the enzyme urease thereupon, and
(b) inhibiting the nitrification of ammonium nitrogen juxtaposed soil systems, said nitrification of ammonium nitrogen being to nitrite and nitrate and being due to the action of nitrosomonas bacteria on ammonium nitrogen and nitrobacter bacteria on nitrite nitrogen,
said method consisting essentially of exposing said enzyme and said bacteria to relatively small predetermined amounts of at least one N-HALO-2-OXAZOLIDINONE of the formula

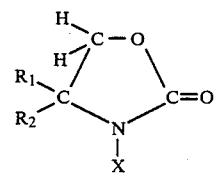

wherein X is selected from the group consisting of chlorine or bromine; wherein R1 is C1-C4 alkyl; and wherein R2 is selected from the group consisting of C1-C4 alkyl, hydroxy, hydroxymethyl, C1-C4 alkoxy, and substituted phenyl (-Ph-R).

21. The method of claim 20 wherein said N-HALO-2-OXAZOLIDINONE is 3-bromo-4,4-dimethyl-2-oxazolidinone of the formula

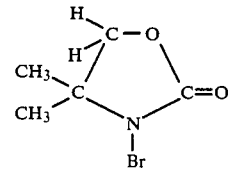

22. The method of claim 20 wherein said N-HALO-2-OXAZOLIDINONE is 3-chloro-4,4-dimethyl-2-oxazolidinone of the formula

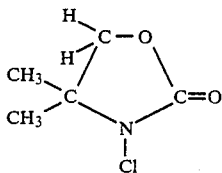

23. A method for substantially simultaneously:
(a) controlling enzymatic decomposition of urea juxtaposed soil systems, said enzymatic decomposition of urea being to ammonia and carbonic acid and being due to the action of the enzyme urease thereupon, and
(b) inhibiting the nitrification of ammonium nitrogen juxtaposed soil systems, said nitrification of ammonium nitrogen being to nitrite and nitrate and being due to the action of nitrosomonas bacteria on ammonium nitrogen and nitrobacter bacteria on nitrite nitrogen,
said method consisting essentially of exposing said enzyme and said bacteria to relatively small predetermined amounts of:
(A) at least one N,N'-DIHALO-2-IMIDAZOLIDINONE of the formula

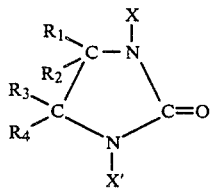

wherein X and X' are halogens selected from the group consisting of chlorine, bromine, and mixtures thereof; wherein R1, R2, R3, and R4 are selected from the group consisting of hydrogen. C1-C4 alkyl, C1-C4 alkoxy, hydroxy, substituted phenyl, and mixtures thereof; and wherein not more than one of the substituents R1-R4 is hydrogen, and
(B) at least one N-HALO-2-OXAZOLIDINONE of the formula

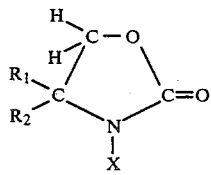

wherein X is selected from the group consisting of chlorine or bromine; wherein R1 is C1-C4 alkyl; and wherein R2 is selected from the group consisting of C1-C4 alkyl, hydroxy, hydroxymethyl, C1-C4 alkoxy, and substituted phenyl (-Ph-R).

24. The method of claim 1 wherein said compound or compounds having the formula shown therein are applied before, after, or in conjunction with said urea, which urea is juxtaposed said soil system or in vivo solution systems; and wherein said compound or compounds are applied at their aggregate rate ranging from about 0.01 to about 10 percent of the urea wt./wt. basis.

25. The method of claim 5 wherein said compound or compounds having the formula shown therein are applied before, after, or in conjunction with said urea, which urea is juxtaposed said soil system or in vivo solution systems; and wherein said compound or compounds are applied at their aggregate rate ranging from about 0.01 to about 10 percent of the urea wt./wt. basis.

26. The method of claim 8 wherein said N,N'-DIHALO-2-IMIDAZOLIDINONE and said N-HALO-2-OXAZOLIDINONE are applied before, after, or in conjunction with said urea nitrogen, which urea nitrogen is juxtaposed said soil system or in vivo solution systems; and wherein said compounds are applied at their aggregate rate ranging from about 0.01 to about 10 percent of the urea nitrogen (expressed as urea) wt./wt. basis.

27. The method of claim 9 wherein said compound or compounds having the formula shown therein are applied before, after, or in conjunction with said ammonium and/or urea nitrogen, which ammonium and/or urea nitrogen is juxtaposed said soil system; and wherein said compound or compounds are applied at their aggregate rate ranging from about 0.01 to about 10 percent of the ammonium and/or urea nitrogen (expressed as urea) wt./wt. basis.

28. The method of claim 13 wherein said compound or compounds having the formula shown therein are applied before, after, or in conjunction with said ammonium and/or urea nitrogen, which ammonium and/or urea nitrogen is juxtaposed said soil system; and wherein said compound or compounds are applied at their aggregate rate ranging from about 0.01 to about 10 percent of the ammonium and/or urea nitrogen (expressed as urea) wt./wt. basis.

29. The method of claim 15 wherein said N,N'-DIHALO-2-IMIDAZOLIDINONE and said N-HALO-2-OXAZOLIDINONE are applied before, after, or in conjunction with said ammonium and/or urea nitrogen, which ammonium and/or urea nitrogen is juxtaposed said soil system, and wherein said compounds are applied at their aggregate rate ranging from about 0.01 to about 10 percent of the ammonium and/or urea nitrogen (expressed as urea) wt./wt. basis.

30. The method of claim 16 wherein said compound or compounds having the formula shown therein are applied before, after, or in conjunction with said urea and said ammonium nitrogen, which urea and ammonium nitrogen is juxtaposed said soil system; and wherein said compound or compounds are applied at their aggregate rate ranging from about 0.01 to about 10 percent of the urea and ammonium nitrogen (expressed as urea) wt./wt. basis.

31. The method of claim 20 wherein said compound or compounds having the formula shown therein are applied before, after, or in conjunction with said urea and said ammonium nitrogen, which urea and ammonium nitrogen is juxtaposed said soil system; and wherein said compound or compounds are applied at their aggregate rate ranging from about 0.01 to about 10 percent of the urea and ammonium nitrogen (expressed as urea) wt./wt. basis.

32. The method of claim 23 wherein said N,N'-DIHALO-2-IMIDAZOLIDINONE and said N-HALO-2-OXAZOLIDINONE are applied before, after, or in conjunction with said urea and ammonium nitrogen, which urea and ammonium nitrogen is juxtaposed said soil system, and wherein said compounds are applied at their aggregate rate ranging from about 0.01 to about 10 percent of the urea and ammonium nitrogen (expressed as urea) wt./wt. basis.

* * * * *